(12) United States Patent
Shimane et al.

(10) Patent No.: US 8,651,679 B2
(45) Date of Patent: Feb. 18, 2014

(54) DISPLAY DEVICE

(75) Inventors: Hiroyuki Shimane, Saitama (JP);
Hirohisa Tanaka, Saitama (JP); Akio Ito, Saitama (JP); Kazuya Sato, Saitama (JP)

(73) Assignee: Jeco Co., Ltd., Saitama (JP)

( * ) Notice: Subject to any disclaimer, the term of this patent is extended or adjusted under 35 U.S.C. 154(b) by 148 days.

(21) Appl. No.: 13/419,544

(22) Filed: Mar. 14, 2012

(65) Prior Publication Data

US 2013/0094175 A1 Apr. 18, 2013

(30) Foreign Application Priority Data

Oct. 18, 2011 (JP) ................................. 2011-228986

(51) Int. Cl.
*G01D 11/28* (2006.01)
*F01P 11/16* (2006.01)
*B01D 1/26* (2006.01)

(52) U.S. Cl.
USPC ............. 362/23.21; 362/23.09; 362/23.16; 362/555; 362/471; 116/48; 116/54; 116/286

(58) Field of Classification Search
USPC .......... 362/23.07, 23.09, 23.12–23.14, 23.16, 362/23.19, 23.21, 555, 471; 116/47, 48, 53, 116/54, 62.4, 286, 288
See application file for complete search history.

(56) References Cited

U.S. PATENT DOCUMENTS

| | | | |
|---|---|---|---|
| 2,287,605 A * | 6/1942 | Dickson et al. | 116/62.3 |
| 2,290,278 A | 7/1942 | Failla et al. | |
| 4,380,043 A * | 4/1983 | Takamatsu et al. | 362/26 |
| 5,372,087 A | 12/1994 | Kato et al. | |
| 5,546,888 A | 8/1996 | Skiver et al. | |
| 5,603,283 A | 2/1997 | Owen | |
| 5,706,757 A | 1/1998 | Hashimoto et al. | |
| 6,178,917 B1 * | 1/2001 | Jansa | 116/286 |
| 6,854,416 B2 * | 2/2005 | Breinich et al. | 116/202 |
| 7,038,975 B2 * | 5/2006 | Ferri et al. | 368/67 |
| 7,305,932 B2 * | 12/2007 | Hildebrand et al. | 116/301 |
| 2002/0108555 A1 | 8/2002 | Breinich et al. | |

FOREIGN PATENT DOCUMENTS

| | | |
|---|---|---|
| JP | 08-297036 | 11/1996 |
| JP | 2002-277290 | 9/2002 |

\* cited by examiner

*Primary Examiner* — Diane I Lee
*Assistant Examiner* — Kenny C Sokolowski
(74) *Attorney, Agent, or Firm* — IPUSA, PLLC

(57) ABSTRACT

A display device includes a first light guide member provided with a first reflecting surface formed at its first end to reflect light emitted by a light source; a second light guide member provided with a penetrating hole in which the first light guide member is intended to be inserted and a second reflecting surface formed at its first end to reflect the light; a first pointer and a second pointer fixed to the first end of the first light guide member and the first end of the second light guide member to be illuminated by the light reflected by the first reflection surface and the second reflection surface, respectively, and a driving member configured to separately rotate the first light guide member and the second light guide member around a same rotation axis with the first pointer and the second pointer, respectively.

10 Claims, 16 Drawing Sheets

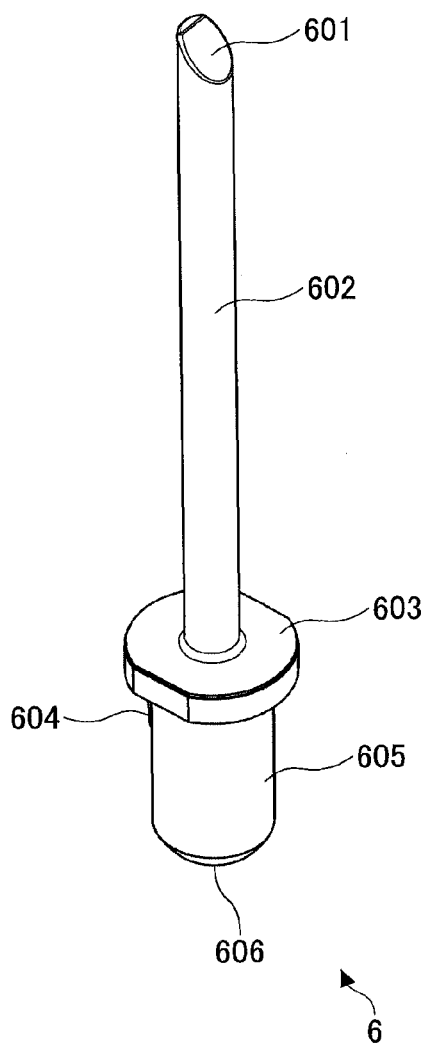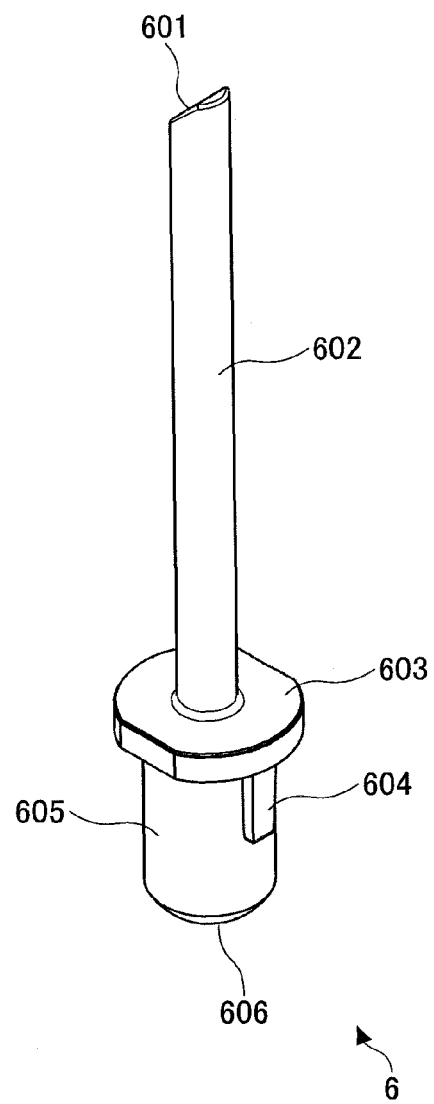

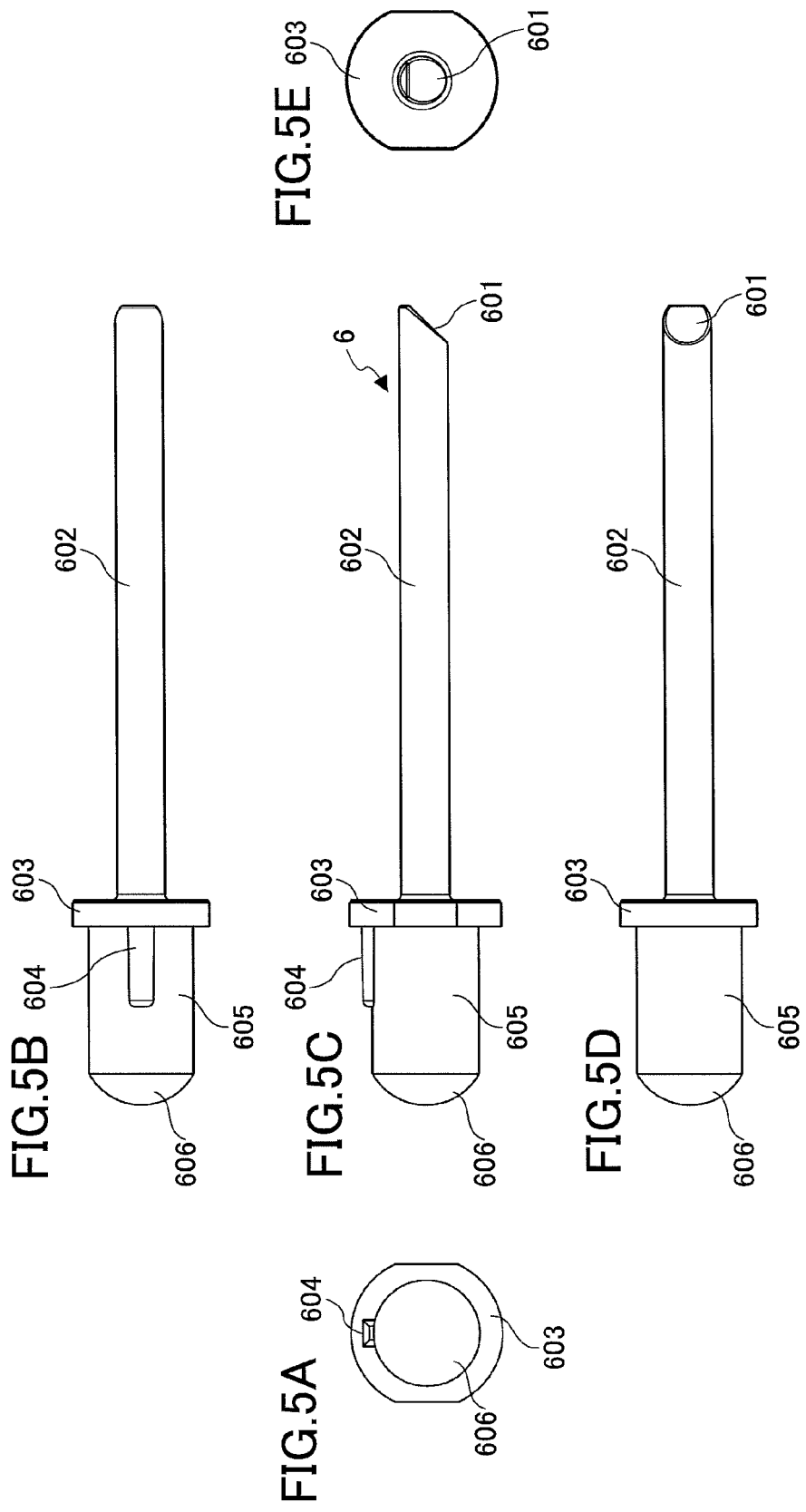

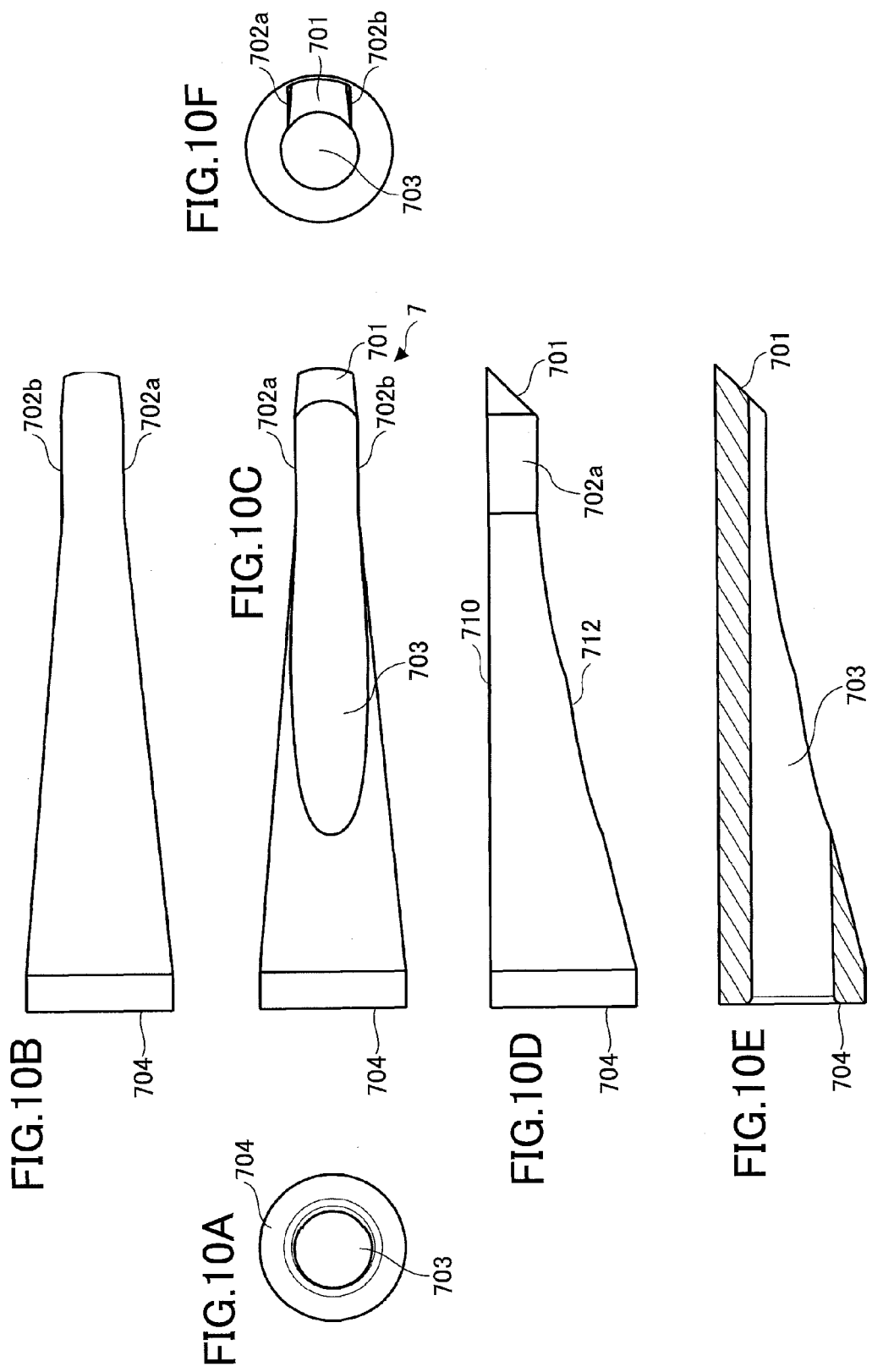

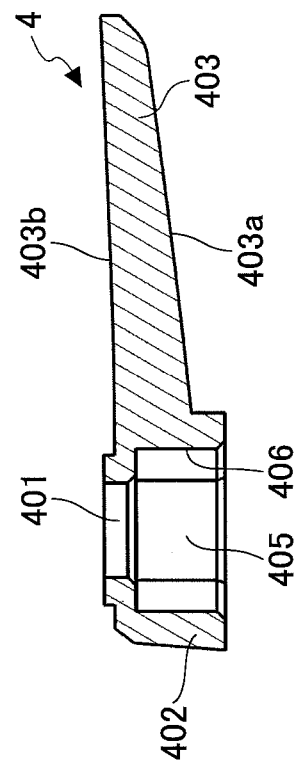
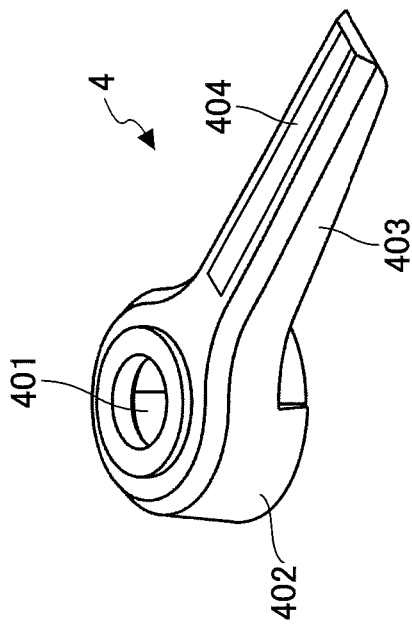
FIG.13B
FIG.13A

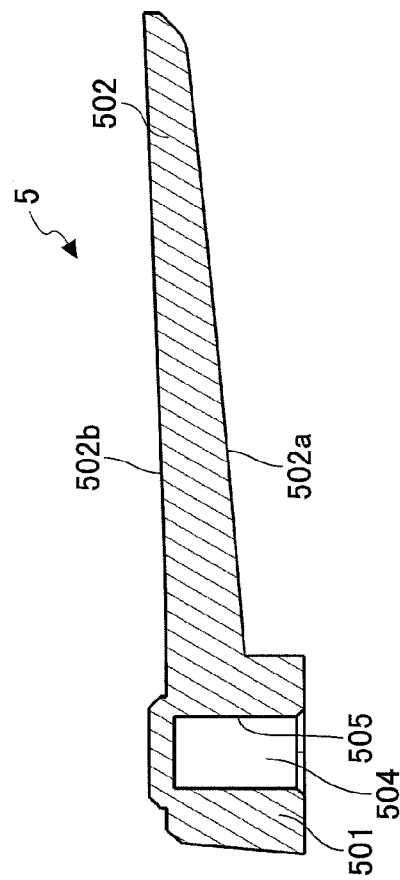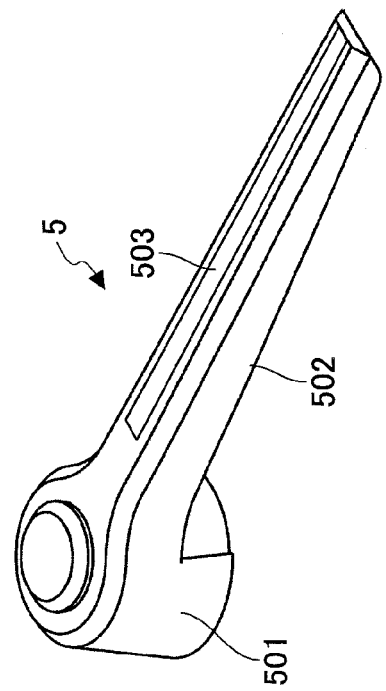

DISPLAY DEVICE

BACKGROUND OF THE INVENTION

1. Field of the Invention

The present invention relates to a display device provided for an automobile, an aircraft, a ship or the like and more specifically, to a display device including two illuminated pointers capable of being read in the dark.

2. Description of the Related Art

In a cockpit or a driver's seat in an automobile, an aircraft, a ship or the like, a display device for displaying speed, time, altitude, temperature or the like is provided. Such a display device generally includes a dial or the like and a display pointer provided in front of the dial to be rotated to point to a number or the like on the dial for indicating speed, time or the like.

Further, Patent Document 1 discloses an illuminated display pointer in which a pointer in addition to a dial is illuminated so that speed, time, or the like can be read even in the dark, in a tunnel or the like.

Further, a display device (a pointer device for displaying speed and engine speed, an analog clock for displaying time by a short pointer and a long pointer, or the like) including two or more illuminated pointers, which are coaxially but separately rotated, capable of being read in the dark is known.

For such a structure, Patent Document 2 discloses a display device including two illuminated pointers which are positioned up and down in which a light source is commonly provided for the pointers and the light from the light source is provided to the pointers via a light splitter.

Patent Documents

[Patent Document 1] Japanese Laid-open Patent Publication No. H08-297036

[Patent Document 2] Japanese Laid-open Patent Publication No. 2002-277290

However, by the display device disclosed in Patent Document 2, in order to illuminate the pointers with enough light so that they can be read in the dark, it is necessary to have the diameters of the light splitter and the pointers around the rotation axis larger and the thickness of the pointers in the rotation axis direction thicker.

A display device having such a structure, cannot have a good design. Further, as the pointers are made thicker, the distance between the pointers and the dial become longer, which in turn causes a parallax by which the positions the pointers indicate are seen differently depending on the direction from which the pointers are viewed.

SUMMARY OF THE INVENTION

The present invention is made in light of the above problems, and provides a display device capable of illuminating pointers with enough amount of the light so that they can be read in the dark while having the diameters of the pointers around a rotation axis smaller and the thickness of the pointers in the rotation axis direction thinner to improve the appearance of the display device and reduce a parallax.

According to the embodiment, there is provided a display device including, a light source; a first light guide member having a circular cylinder shape and provided with a first reflecting surface formed at a first end of the first light guide member to reflect light emitted by the light source and received at a second end of the first light guide member opposite to the first end; a second light guide member provided with a penetrating hole in which the first light guide member is intended to be inserted to surround at least a part of the first light guide member and a second reflecting surface formed at a first end of the second light guide member to reflect the light emitted by the light source and received at a second end of the second light guide member opposite to the first end, the light source being provided at the second end sides of the first light guide member and the second light guide member; a first pointer fixed to and supported by the first end of the first light guide member to be illuminated by the light guided from the first light guide member by being reflected by the first reflection surface; a second pointer fixed to and supported by the first end of the second light guide member to be illuminated by the light guided from the second light guide member by being reflected by the second reflection surface; and a driving member configured to separately rotate the first light guide member and the second light guide member around a same rotation axis with the first pointer and the second pointer, respectively.

BRIEF DESCRIPTION OF THE DRAWINGS

Other objects, features and advantages of the present invention will become more apparent from the following detailed description when read in conjunction with the accompanying drawings.

FIG. 4A and FIG. 4B are perspective views of a first light guide member of an embodiment;

FIG. 5A is a bottom view, FIG. 5B and FIG. 5D are side views, FIG. 5C is a plan view, and FIG. 5E is a top view, of the first light guide member shown in FIG. 4A and FIG. 4B;

FIG. 10A is a bottom view, FIG. 10B is a back view, FIG. 10C is a plan view, FIG. 10D is a side view, FIG. 10E is a cross-sectional view and FIG. 10F is a top view, of the second light guide member shown in FIG. 9A and FIG. 9B;

FIG. 13A is a perspective view of a short pointer of an embodiment;

FIG. 13B is a cross-sectional view of the short pointer of an embodiment;

FIG. 14A is a perspective view of a long pointer of an embodiment;

FIG. 14B is a cross-sectional view of the long pointer of an embodiment;

DETAILED DESCRIPTION OF THE PREFERRED EMBODIMENTS

Figure 1:
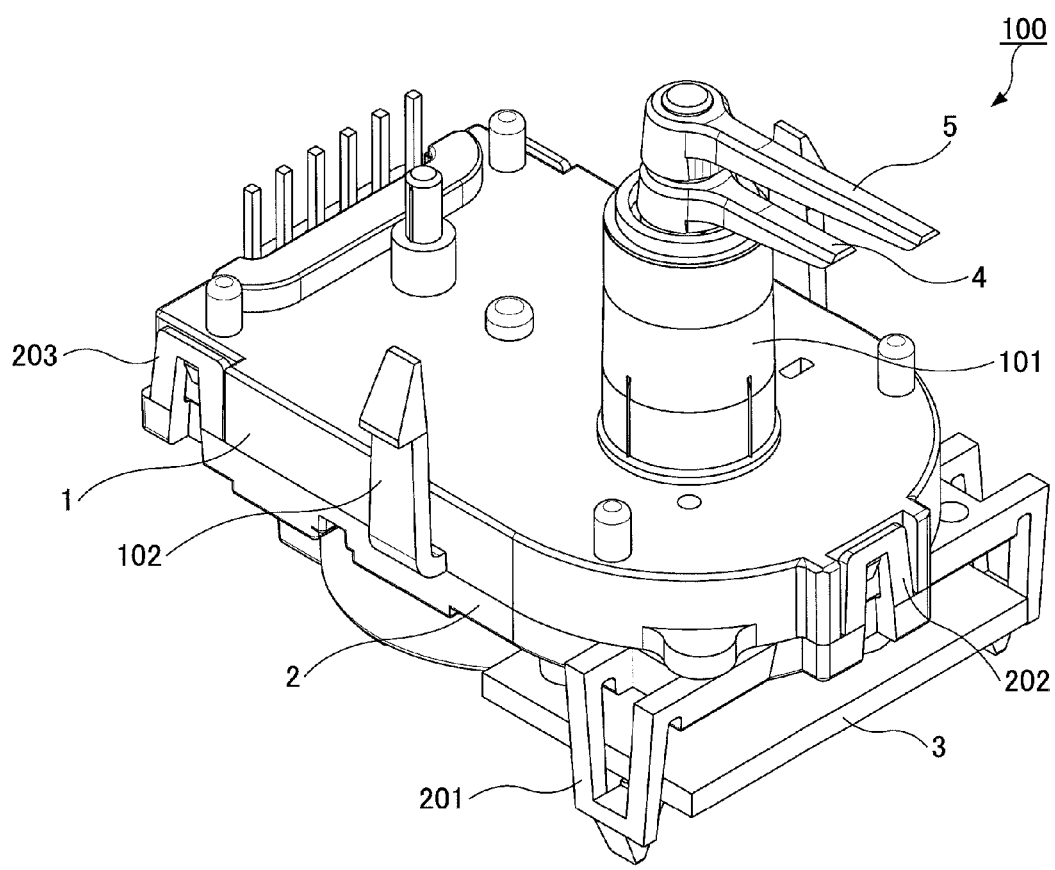
FIG. 1 is a perspective view of an example of a display device of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(Structure of Display Device)

The structure of a display device 100 of an embodiment is explained with reference to FIG. 1 to FIG. 3.

Figure 2:
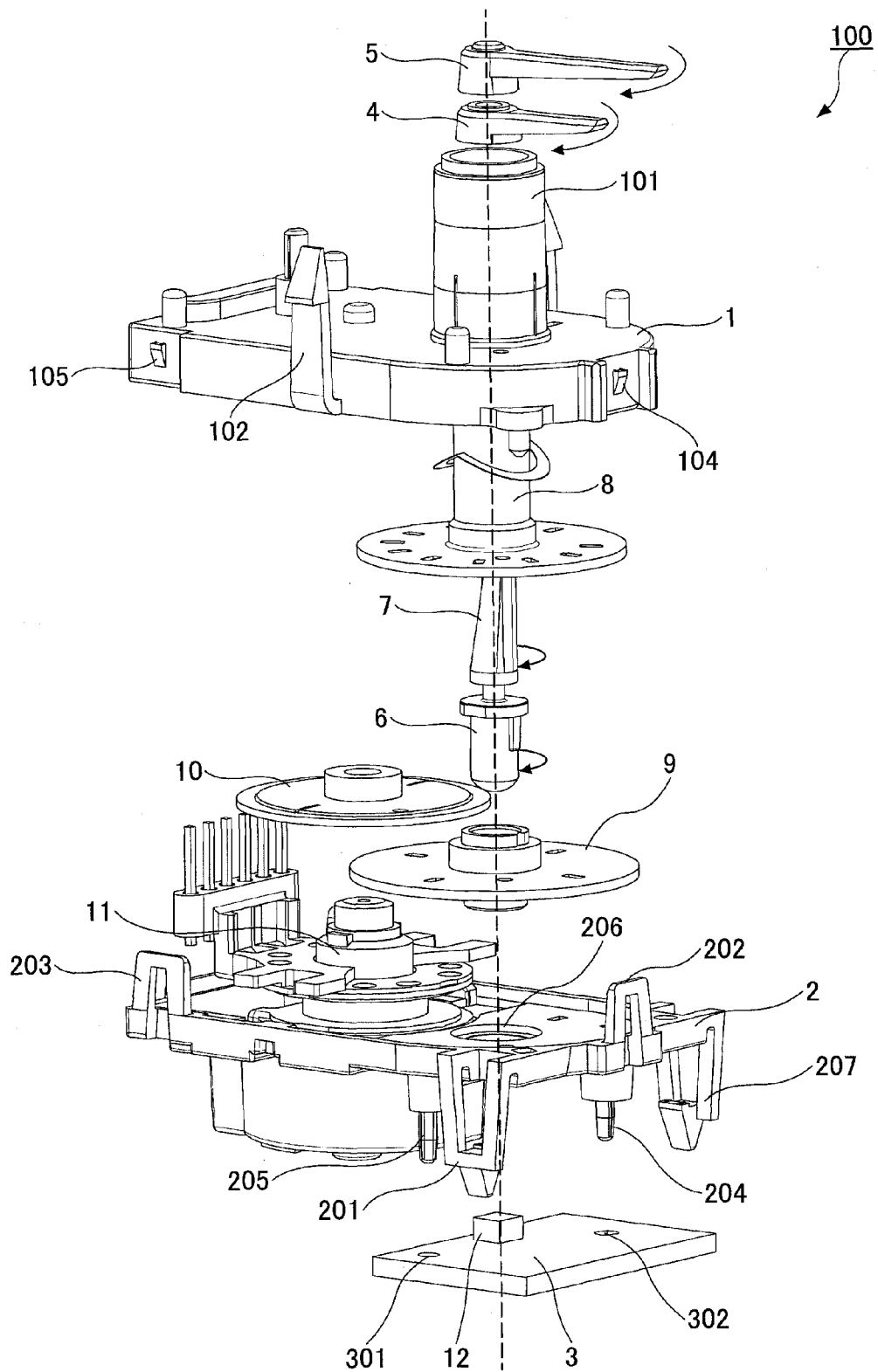
FIG. 2 is an exploded view of the display device shown in FIG. 1.

FIG. 1 is a perspective view of an example of the display device 100 of the embodiment. FIG. 2 is an exploded view of the display device 100 of the embodiment. FIG. 3 is a cross-sectional view of the display device 100 of the embodiment.

The display device 100 of the embodiment includes an upper main housing 1, a lower main housing 2, a substrate 3 on which an LED 12 as a light source is provided, a short pointer 4 (second pointer) and a long pointer 5 (first pointer), a first light guide member 6, a second light guide member 7, a shading member 8, a gear member 9, a driving member 11.

Although not shown in the drawings, the display device 100 further includes a dial, an operations panel including a dial or the like provided between the short pointer 4 and the long pointer 5, and the upper main housing 1 so that the short pointer 4 and the long pointer 5 point to characters, numbers or the like shown on the dial or the like by being rotated. In this embodiment, the short pointer 4 and the long pointer 5 are coaxially rotated by the driving member 11.

The upper main housing 1 is provided with a cylindrical portion 101, a claw 102 and protruding portions 104 and 105 formed at its side surface. The short pointer 4 and the long pointer 5 are provided on the cylindrical portion 101 of the upper main housing 1.

The lower main housing 2 is provided with claws 202 and 203, positioning portions 204 and 205, a light guide opening 206 through which the light of the LED 12 passes, and support members 201 and 207 for supporting the substrate 3. The driving member 11 is provided on the lower main housing 2 to be installed in the upper main housing 1 and the lower main housing 2. The driving member 11 includes a gear 10.

The first light guide member 6 and the second light guide member 7 guide light from the LED 12 to the long pointer 5 and the short pointer 4, respectively. The first light guide member 6 and the second light guide member 7 are prisms.

The protruding portions 104 and 105 of the upper main housing 1 engage with the claws 202 and 203 of the lower main housing 2, respectively. The display device 100 is structured such that the claw 102 provided to the upper main housing 1 engages with the dial or the like (not shown in the drawings) while the upper main housing 1 and the lower main housing 2 are fixed by the protruding portions 104 and 105 and the claws 202 and 203, respectively.

The LED 12 provided on the substrate 3 is positioned below the lower main housing 2 such that the light emitted by the LED 12 is guided by the first light guide member 6 and the second light guide member 7 positioned in the cylindrical portion 101 of the upper main housing 1 to the long pointer 5 and the short pointer 4 to illuminate the long pointer 5 and the short pointer 4, respectively. With this structure, the long pointer 5 and the short pointer 4 can be read even at night or in the dark.

The substrate 3 is provided with positioning holes 301 and 302 which engage with the positioning portions 204 and 205 of the lower main housing 2 for positioning the LED 12 with respect to the lower main housing 2. With this structure, the substrate 3 is fixed to the lower main housing 2 for suppressing the positional shift of the LED 12 to the minimum.

The shading member 8, the first light guide member 6, the second light guide member 7 or the like are positioned in the cylindrical portion 101 of the upper main housing 1. The first light guide member 6 fits with the gear member 9 to be rotated around a rotation axis shown by a dotted line in the direction shown by an arrow in FIG. 2 by the driving force of the driving member 11.

Further, the second light guide member 7 is fitted in the shading member 8 to be fixed to and supported by the shading member 8. A gear 805 (see FIG. 11, which will be explained later) integrally formed with the shading member 8 fits with the gear 10 of the driving member 11 to be rotated by the driving member 11. With this structure, the second light guide member 7 is coaxially but separately rotated with the first light guide member 6 around the same rotation axis in the direction shown by an arrow in FIG. 2.

The short pointer 4 is fixed to and supported by a first end (upper end) of the second light guide member 7 via the shading member 8. The long pointer 5 is fixed to and supported by a first end (upper end) of the first light guide member 6. With this structure, the short pointer 4 and the long pointer 5 are separately rotated around the same rotation axis by the driving member 11.

Further, the first light guide member 6 and the second light guide member 7 are positioned right above the LED 12 to receive the light emitted by the LED 12 at second ends opposite to the first ends which support the long pointer 5 and the short pointer 4, respectively.

With this structure, the light emitted by the LED 12 passes through the first light guide member 6 and the second light guide member 7 to reach the long pointer 5 and the short pointer 4 for illuminating the long pointer 5 and the short pointer 4, respectively.

As described above, the first light guide member 6 is fitted with the gear member 9 to be rotated by the driving member 11 around the rotation axis shown by the dotted line. The second light guide member 7 fixed to and supported by the shading member 8 is rotated with the shading member 8, but separately from the first light guide member 6, when the shading member 8 is rotated by the driving member 11.

The long pointer 5 is fixed to and supported by the first end of the first light guide member 6 to be rotated with the first light guide member 6, while the short pointer 4 is fixed to and supported by the first end of the second light guide member 7 via the shading member 8 to be rotated with the second light guide member 7.

The LED 12 is positioned on an extended line of the rotation axis of the long pointer 5 and the short pointer 4 at the first end side of the first light guide member 6 and the second light guide member 7 opposite to the long pointer 5 or the short pointer 4. The first light guide member 6 and the second light guide member 7 receive the light emitted by the LED 12 at the second ends. The light received by the first light guide member 6 and the second light guide member 7 are reflected at a reflecting surface 601 (first reflecting surface) and a reflecting surface 701 (second reflecting surface) formed at the first ends of the first light guide member 6 and the second light guide member 7 to be guided to the long pointer 5 and the short pointer 4 to illuminate the long pointer 5 and the short pointer 4, respectively.

The first light guide member 6 has a substantially circular cylinder shape extending in the rotation axis direction. The first light guide member 6 is provided with a light receiving portion 605 that receives the light from the LED 12, and an inserting portion 602 which is inserted in the second light guide member 7. The light receiving portion 605 has a spherical shape surface (light receiving surface). The first light guide member 6 is configured such that the light received by the light receiving portion 605 is passed through the inserting portion 602 and is reflected at the reflecting surface 601 to be guided to the long pointer 5. The reflecting surface 601 is inclined about 45° with respect to the rotation axis direction.

The second light guide member 7 is provided with a light receiving surface 704 formed at its second end. The light receiving surface 704 is positioned to face the light receiving portion 605 of the first light guide member 6 so that the light receiving surface 704 can receive the light passed through the light receiving portion 605. This means that the light receiving portion 605 of the first light guide member 6 in this embodiment functions as a light splitter. The reflecting surface 701 is formed at the first end of the second light guide member 7 at a position shifted from the rotation axis of the second light guide member 7. The reflecting surface 701 is inclined about 45° with respect to the rotation axis direction. The light received by the light receiving surface 704 is reflected at the reflecting surface 701 to be guided to the short pointer 4.

The second light guide member 7 is further provided with a penetrating hole in which the inserting portion 602 of the first light guide member 6 is inserted. The second light guide member 7 has a substantially circular cone shape in which the light receiving surface 704, extending in a direction perpendicular to the rotation axis direction, is a bottom surface and the reflecting surface 701 is a summit. The penetrating hole is formed to extend in the rotation axis direction along the rotation axis from the light receiving surface 704.

(First Light Guide Member 6)

FIG. 4A and FIG. 4B are perspective views of the first light guide member 6 of the embodiment. FIG. 5A is a bottom view, FIG. 5B and FIG. 5D are side views, FIG. 5C is a plan view, and FIG. 5E is a top view, of the first light guide member 6 of the embodiment.

The first light guide member 6 is composed of a translucent material such as a transparent resin or the like. The first light guide member 6 includes the light receiving portion 605 that receives the light from the LED 12, a rib 604 that is intended to fit with the gear member 9 which will be explained later, a flange portion 603, the inserting portion 602 that is inserted into the second light guide member 7, and the reflecting surface 601 that reflects the received light to the long pointer 5.

A light receiving surface 606 of the light receiving portion 605 is formed to have a spherical shape. With this structure, the light emitted by the LED 12, which is radially diffused from the LED 12, can be guided in the direction parallel to the rotation axis direction. Further, the light receiving surface 606 may be formed with a fine pattern by texturing, graining, engraving or the like to diffuse the received light for reducing the bias of the light amount caused by the positional shift of the LED 12 and mixing colors of the light.

Figure 8:
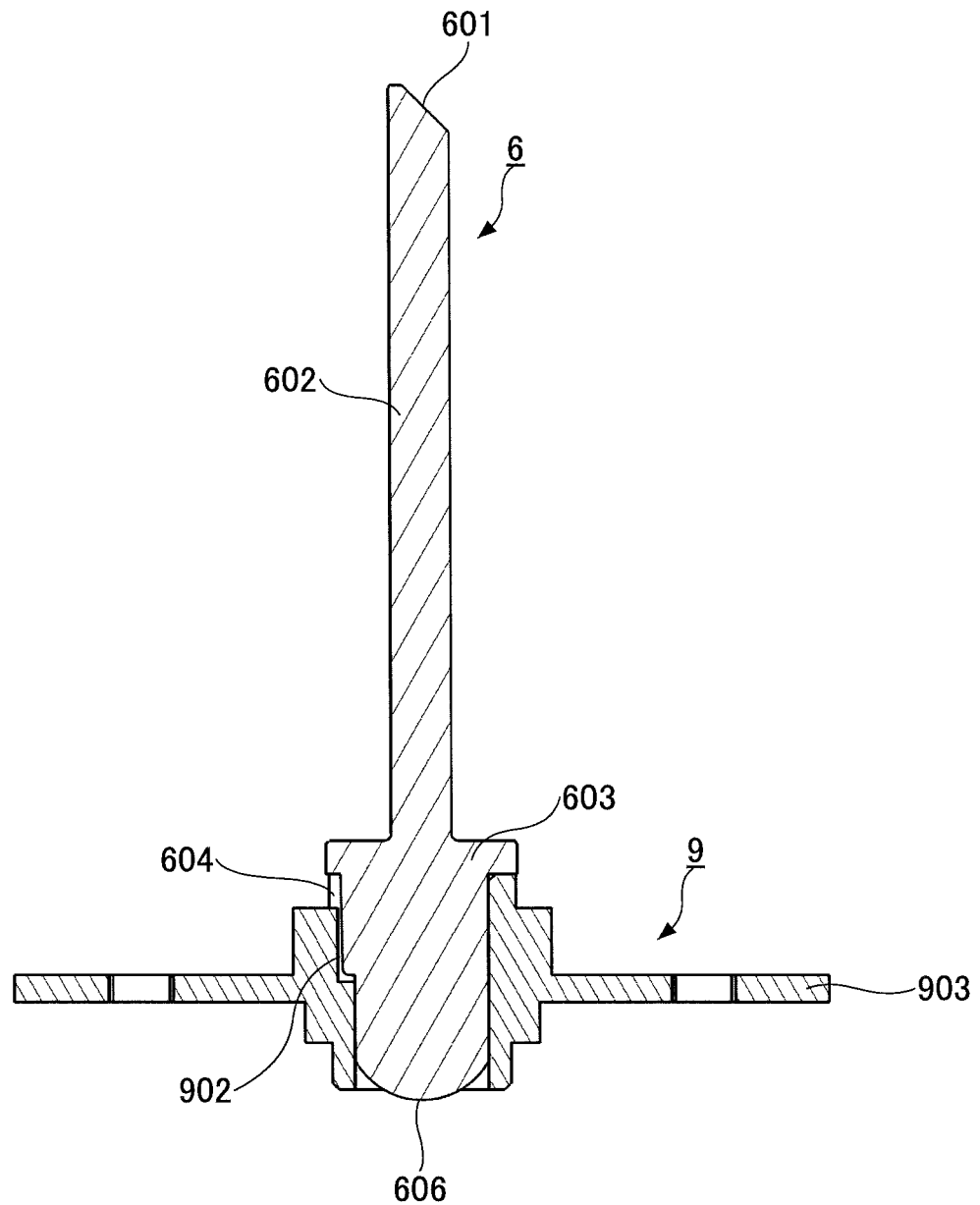
FIG. 8 is a cross-sectional view of the gear to which the first light guide member of an embodiment is fixed.

As will be explained later with reference to FIG. 8, the light receiving portion 605 is inserted into the gear member 9. The gear member 9 is provided with a groove portion 902 with which the rib 604 of the first light guide member 6 fits so that the first light guide member 6 is fixed to the gear member 9 to be rotated by the driving force of the driving member 11.

The flange portion 603, which has a guard shape, is provided at the end of the light receiving portion 605 opposite to the light receiving surface 606 of the light receiving portion 605. The flange portion 603 is supported at the upper surface of the gear member 9 to hold the first light guide member 6 with respect to the gear member 9. The shading member 8 that fixes and supports the second light guide member 7 slides on the flange portion 603 (see FIG. 3, for example).

The inserting portion 602 is inserted into the second light guide member 7 and guides the light from the LED 12 received by the light receiving portion 605 to the reflecting surface 601.

Figure 3:
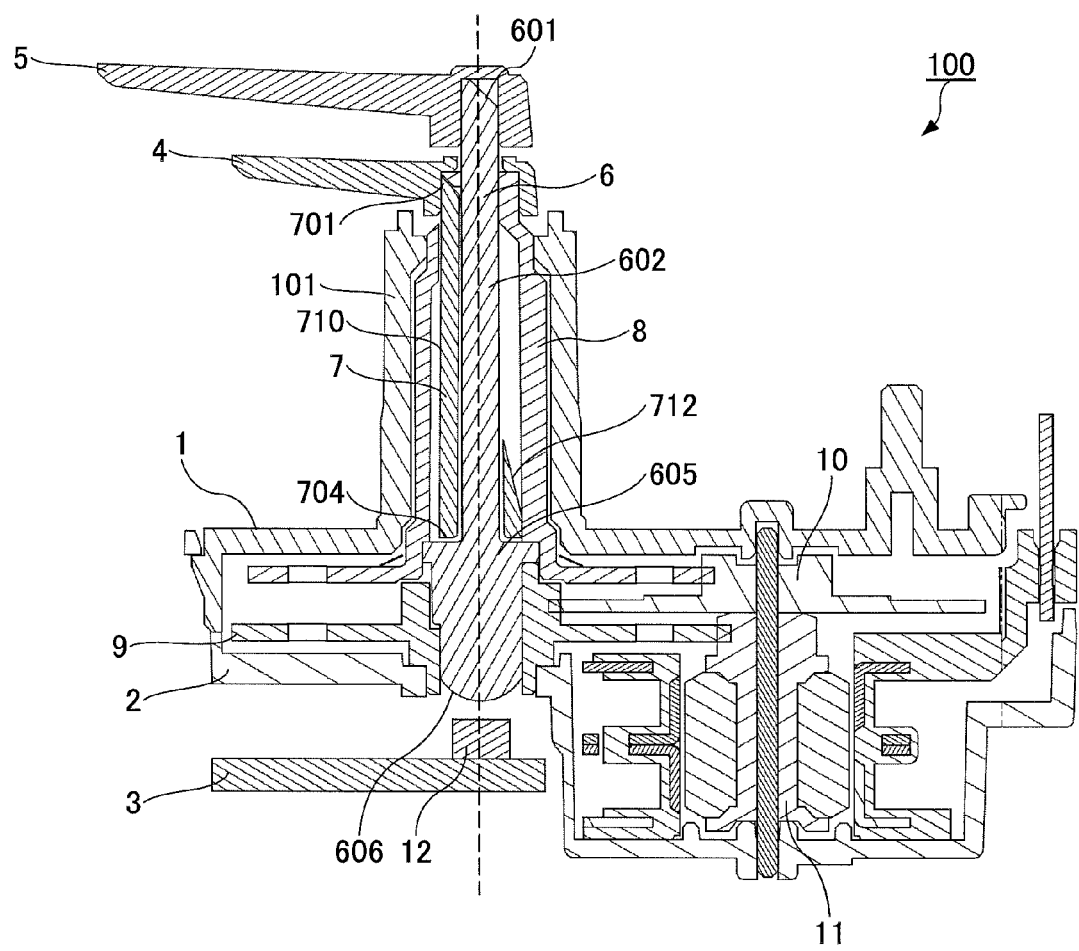
FIG. 3 is a cross-sectional view of the display device of an embodiment.

As shown in FIG. 3, the reflecting surface 601 formed at the first end of the first light guide member 6 opposite to the light receiving portion 605 is fitted in the long pointer 5 to fix and support the long pointer 5. The reflecting surface 601 guides the light passed through the inserting portion 602 to the long pointer 5 to illuminate the long pointer 5.

Figure 6:
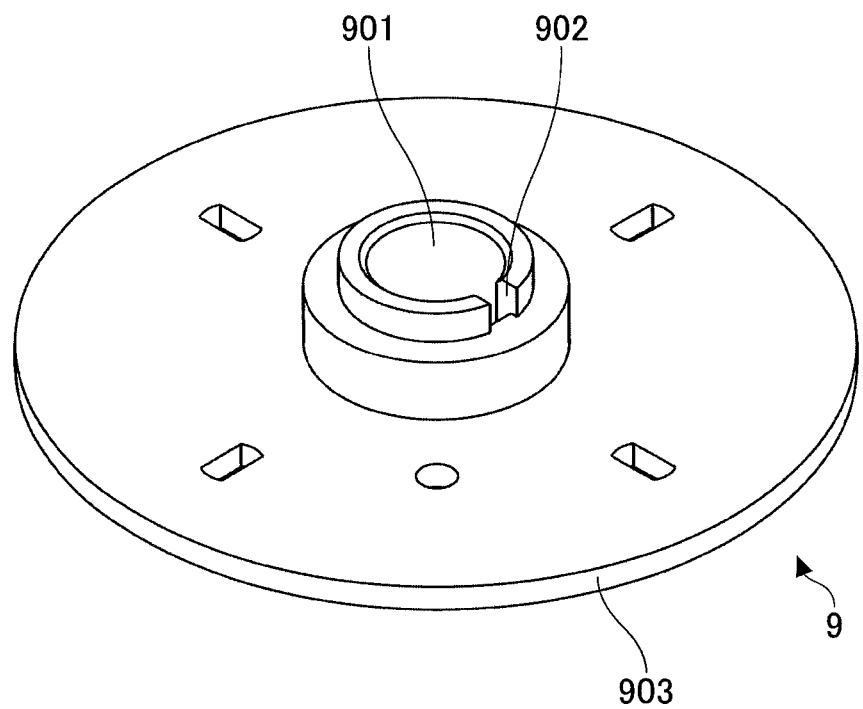
FIG. 6 is a perspective view of a gear that is fixed to the first light guide member of an embodiment.

FIG. 6 is a perspective view of the gear member 9 that is intended to be fixed to the first light guide member 6 of the embodiment.

The gear member 9 is provided with an inserting hole 901 formed at its center in which the light receiving portion 605 of the first light guide member 6 is inserted, in addition to the groove portion 902 as described above. When the light receiving portion 605 is inserted into the inserting hole 901, the rib 604 is fitted with the groove portion 902 and the flange portion 603 of the first light guide member 6 is held above the inserting hole 901, the first light guide member 6 is fixed to the gear member 9.

Figure 7:
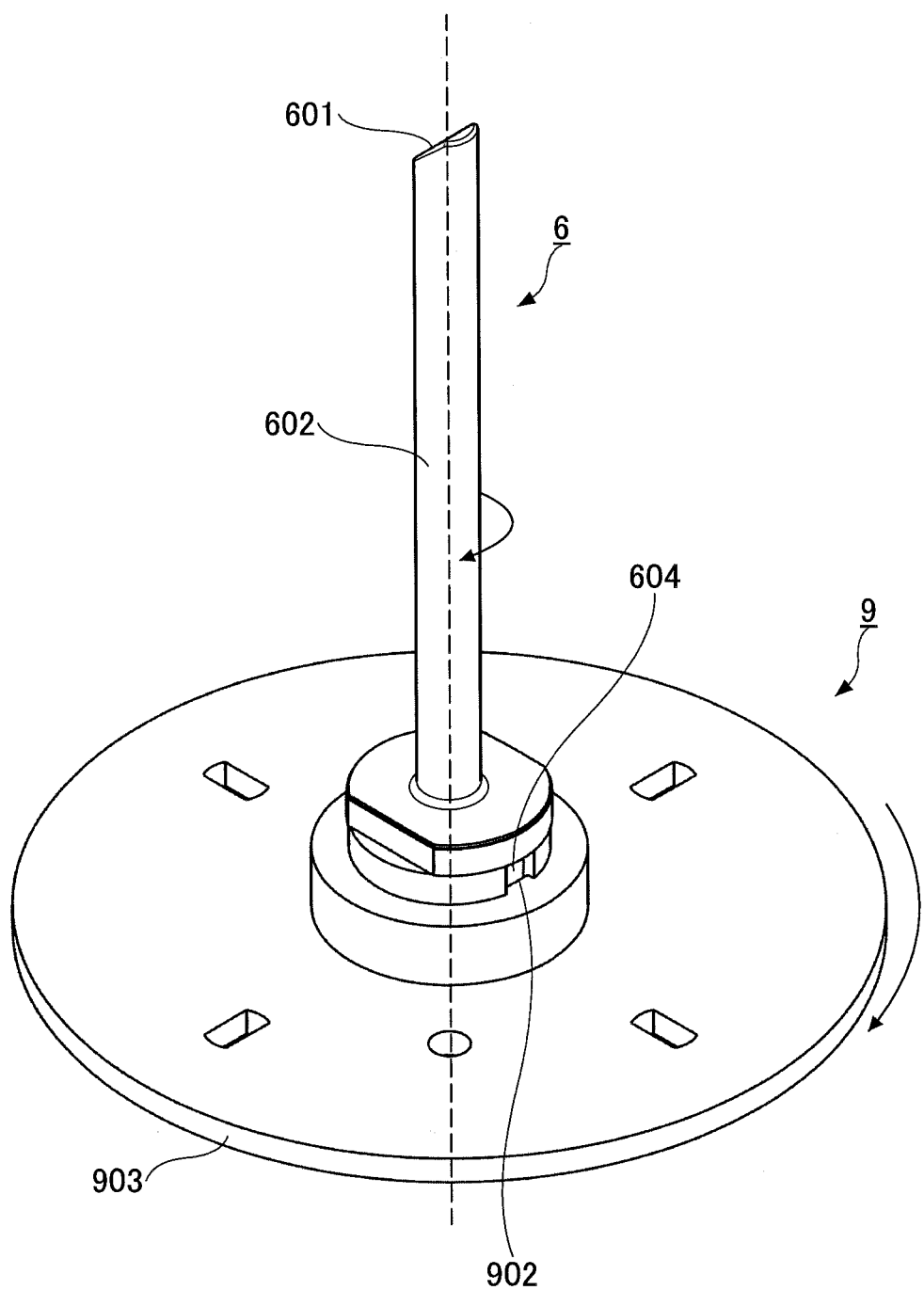
FIG. 7 is a perspective view of the gear to which the first light guide member of an embodiment is fixed.

FIG. 7 is a perspective view of the gear member 9 to which the first light guide member 6 of the embodiment is fixed. FIG. 8 is a cross-sectional view of the gear member 9 to which the first light guide member 6 of the embodiment is fixed.

The gear member 9 is further provided with a gear 903 formed at its side surface. The gear 903 of the gear member 9 engages with the gear of the driving member 11 so that the gear member 9 is rotated around the rotation axis shown by a dotted line in FIG. 7 by the driving force of the driving member 11. The first light guide member 6 is also rotated with the gear member 9 at this time.

(Second Light Guide Member 7)

Figure 9A:
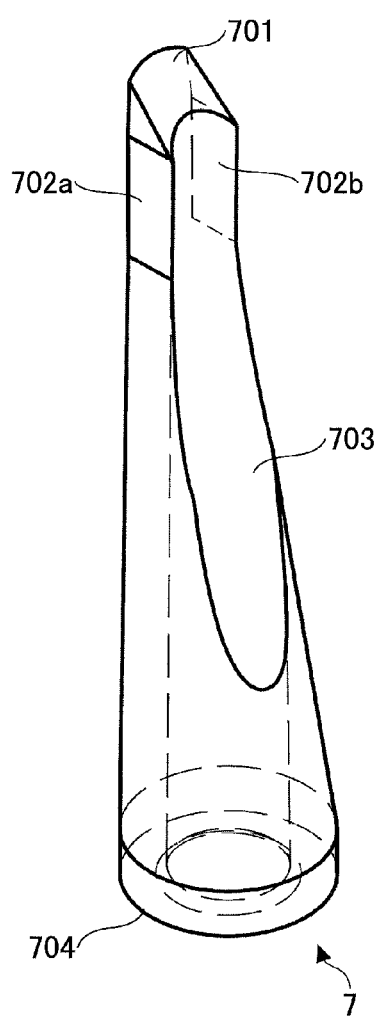
FIG. 9A and FIG. 9B are perspective views of a second light guide member of an embodiment.
Figure 9B:
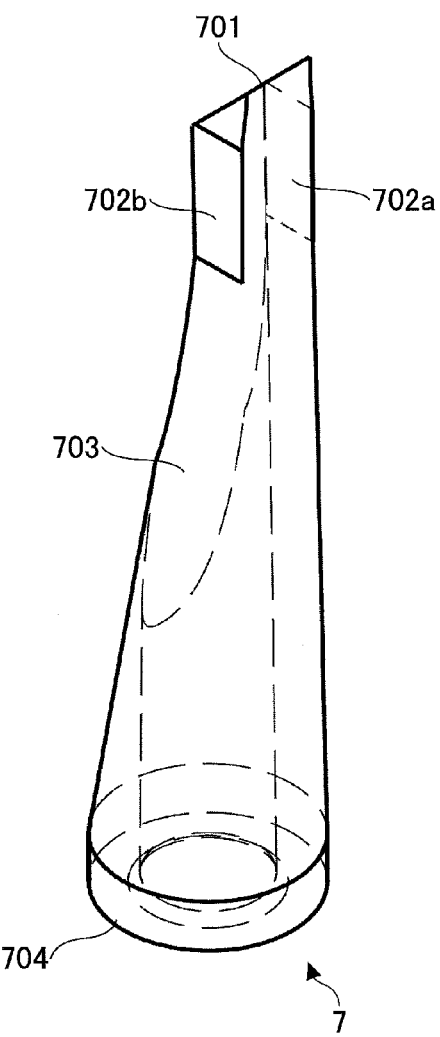

FIG. 9A and FIG. 9B are perspective views of the second light guide member 7 of the embodiment. FIG. 10A is a bottom view, FIG. 10B is a back view, FIG. 10C is a plan view, FIG. 10D is a side view, FIG. 10E is a cross-sectional view and FIG. 10F is a top view, of the second light guide member 7 of the embodiment.

The second light guide member 7 is composed of a translucent material such as a transparent resin or the like. The second light guide member 7 includes the light receiving surface 704 that receives the light from the LED 12 through the light receiving portion 605 of the first light guide member 6, the penetrating hole 703 in which the inserting portion 602 of the first light guide member 6 is inserted, flat portions 702a and 702b which fix to the shading member 8 which will be explained later and the reflecting surface 701 that reflects the received light to the short pointer 4.

As described above, the second light guide member 7 has a substantially circular cone shape in which the light receiving surface 704 perpendicular to the rotation axis is a bottom surface and the reflecting surface 701 which is formed at a position shifted from the rotation axis is a summit. Further, the penetrating hole 703 is formed to extend in the rotation axis direction along the rotation axis from the light receiving surface 704.

Further, the second light guide member 7 has a shape obtained by such as cutting a cylindrical member having openings at both ends, in an inclined direction with a certain angle with respect to its longitudinal axis (which may be parallel to the rotation axis) so that the opening shape at the reflecting surface 701 side of the penetrating hole 703 becomes longer in the rotation axis direction as shown in FIG. 10C. With this structure, the exposed area of the inserting portion 602 of the first light guide member 6 which is inserted into the penetrating hole 703 becomes gradually larger in the direction from the light receiving surface 704 to the reflecting surface 701.

When the inserting portion 602 of the first light guide member 6 is inserted into the second light guide member 7, a portion of the inserting portion 602 at the light receiving surface 704 side is covered by the cylindrical second light guide member 7 while almost all of a portion of the inserting portion 602 at the reflecting surface 701 side is exposed from the second light guide member 7.

As shown in FIG. 3 or FIG. 10D, the second light guide member 7 has a flat surface 710 extending in the rotation axis direction at the side closer to the extending direction of the short pointer 4 (pointer portion side). On the other hand, the second light guide member 7 has an inclined or curved surface 712 at the opposite side of the flat surface 710 that reduces the cross section of the second light guide member 7 at the side nearer to the reflecting surface 701. In other words, the cross section of the area of the second light guide member 7 gradually becomes smaller at the side nearer to the reflecting surface 701 while a part of the second light guide member 7 nearer to the reflecting surface 701 is selectively formed at the side closer to the extending direction of the short pointer 4. With this structure, the light guided into the second light guide member 7 is concentrated to the reflecting surface 701 so that enough amount of the light can be guided to the short pointer 4. The inclined or curved surface 712 may be formed such that the light can be efficiently concentrated to the reflecting surface 701.

With this structure, the second light guide member 7 can efficiently guides the light received at the light receiving surface 704 to the reflecting surface 701.

The reflecting surface 701 of the second light guide member 7 is fitted into the shading member 8 which will be explained later, and the flat portions 702a and 702b formed near the reflecting surface 701 are supported by the shading member 8 to have the second light guide member 7 fixed to and supported by the shading member 8.

Figure 11:
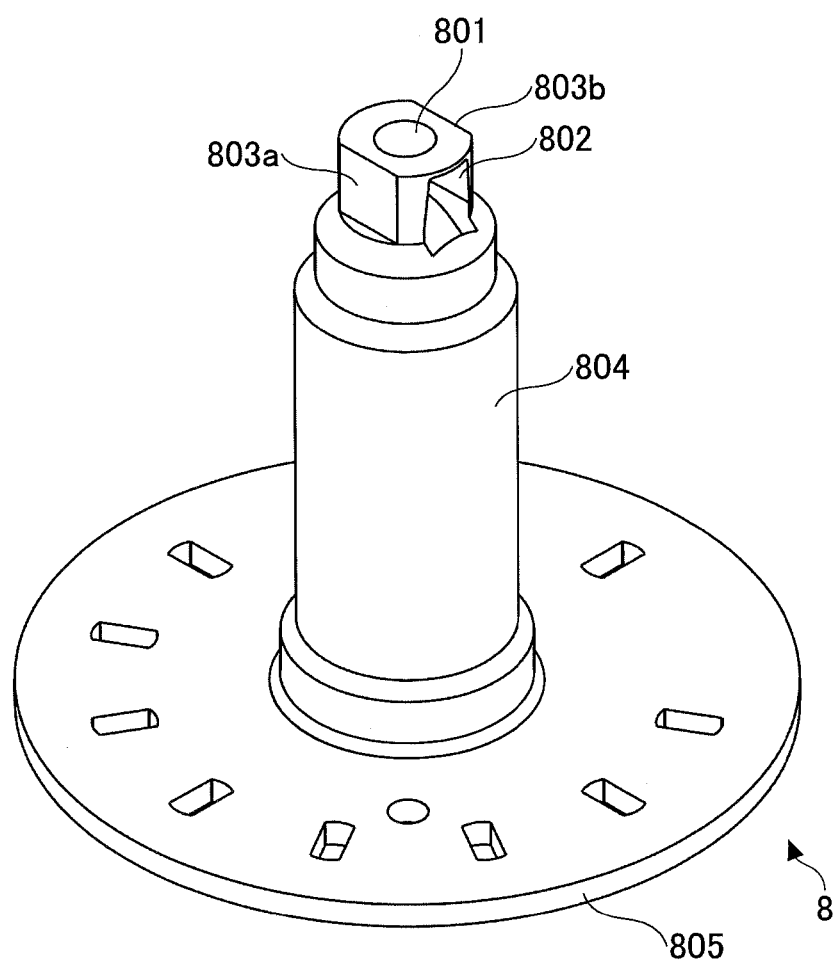
FIG. 11 is a perspective view of a shading member 8 of an embodiment.

FIG. 11 is a perspective view of the shading member 8 of the embodiment.

The shading member 8 is composed of a material that does not pass light, such as an opaque (black) material or the like. The shading member 8 fixes and supports the second light guide member 7 in its inside. Further, the shading member 8 is provided to cover the first light guide member 6 and the second light guide member 7 so that the lights passing through the first light guide member 6 and the second light guide member 7 do not leak.

The shading member 8 is provided with a cylindrical portion 804, an opening portion 801 formed at a first end (upper end) of the cylindrical portion 804 from which the first end of the first light guide member 6 is exposed, a notch portion 802 from which the first end of the second light guide member 7 is exposed, flat portions 803a and 803b and the gear 805 formed at a second end (lower end) of the cylindrical portion 804. The first end of the shading member 8 is formed to have a shape corresponding to a concave portion 405 of the short pointer 4 which will be explained later so that the shading member 8 and the second light guide member 7 are fitted into the short pointer 4 while having the short pointer 4 face at a right direction. Concretely, the flat portions 803a and 803b of the shading member 8 are fitted with the concave portion 405 of the short pointer 4.

Further, as described above, the gear 805 of the shading member 8 fits with the gear 10 of the driving member 11 to be rotated by the driving force of the driving member 11 with the second light guide member 7 and the short pointer 4. By integrally forming the gear 805 with the shading member 8, the number of components of the display device 100 can be minimize to reduce the cost.

Figure 12:
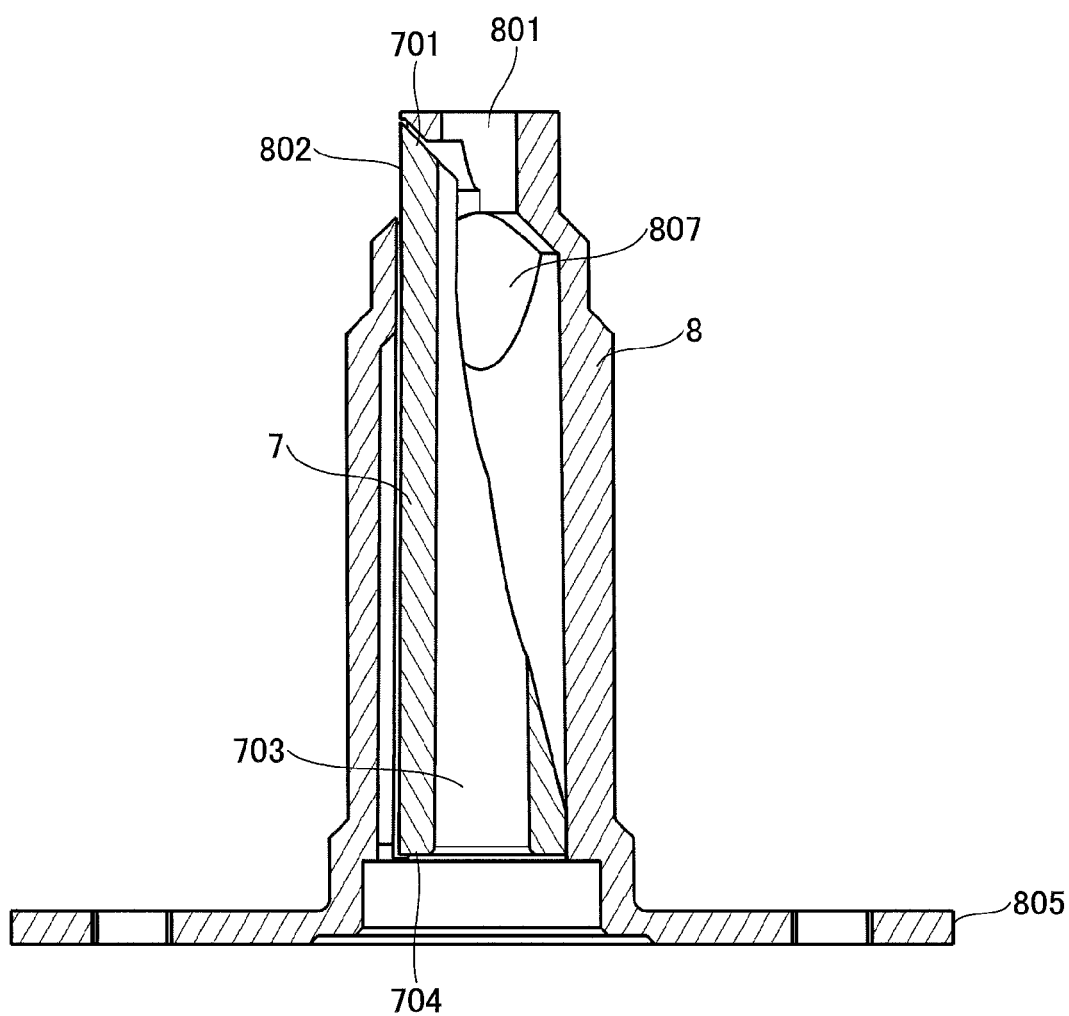
FIG. 12 is a cross-sectional view of the second light guide member and the shading member when the second light guide member is fixed to and supported by the shading member.

FIG. 12 is a cross-sectional view of the second light guide member 7 and the shading member 8 when the second light guide member 7 is fixed to and supported by the shading member 8.

The second light guide member 7 is fitted into the shading member 8 to be fixed to and supported by the shading member 8 while the first end, where the reflecting surface 701 is formed, is exposed from the notch portion 802 of the shading member 8. Further, the short pointer 4 is fitted to the first end of the shading member 8 to cover the notch portion 802 and contact the second light guide member 7 so that the light reflected at the reflecting surface 701 of the second light guide member 7 is guided to the short pointer 4.

Further, the shading member 8 may be provided with an inclined surface 807 formed at its inside that extends along the second light guide member 7 to align the rotational position of the second light guide member 7 at a right position when the second light guide member 7 is inserted into the shading member 8. The inclined surface 807 is tapered to diminishing a space inside the shading member 8 as it goes upward such that the second light guide member 7 is guided to have the flat portions 702a and 702b fit to the shading member 8. With this structure, the rotational position of the second light guide member 7 is aligned.

(Short Pointer 4 and Long Pointer 5)

FIG. 13A is a perspective view of the short pointer 4 of the embodiment. FIG. 13B is a cross-sectional view of the short pointer 4 of the embodiment.

The short pointer 4 includes a pointer portion 403, a shaft 402 and an illuminating portion 404 formed at the pointer portion 403. The short pointer 4 is further provided with an opening portion 401 formed at the upper part of the shaft 402 and the concave portion 405 formed at the lower part of the shaft 402.

The short pointer 4 is composed of a translucent material such as a transparent resin or the like, for example. Further, a metal layer is formed on the surface of the short pointer 4, other than the illuminating portion 404, by metal deposition or the like so that the light guided to the short pointer 4 is selectively illuminated from the illuminating portion 404. The illuminating portion 404 is formed by removing the metal layer at the corresponding area of the short pointer 4 by laser, after forming the metal layer on the entire surface of the short pointer 4.

The concave portion 405 of the shaft 402 has a diameter larger, in the direction perpendicular to the axial direction, than that of the opening portion 401 so that the second light guide member 7 and the shading member 8 can be fitted and fixed in the concave portion 405. In this embodiment, the concave portion 405 has a larger width in the direction perpendicular to the axial direction than the length in the axial direction.

The concave portion 405 is fitted to the first ends of the second light guide member 7 and the shading member 8 so that the first end of the second light guide member 7 contacts the side wall 406 of the short pointer 4 at the pointer portion 403 side within the concave portion 405.

The inserting portion 602 of the first light guide member 6, which is inserted into the second light guide member 7, is exposed from the opening portion 401.

A lower surface 403a and an upper surface 403b of the pointer portion 403 are not in parallel relationship with each other. In this embodiment, the lower surface 403a is inclined with respect to the horizontal direction which is perpendicular to the rotation axis direction. With this structure, the light reflected by the reflecting surface 701 of the second light guide member 7 can be further reflected from the lower surface 403a toward the upper surface 403b. Further, the lower surface 403a may be formed with a fine pattern by texturing, graining, engraving or the like to diffuse the received light.

As described above, the surface of the short pointer 4, other than the illuminating portion 404, is covered by the metal layer. The light does not leak from the short pointer 4 where the metal layer is formed, so that the light only originates from the illuminating portion 404.

With this structure, the light from the LED 12 is guided by the second light guide member 7 to the short pointer 4 and then the light reflected by the lower surface 403a is guided to the illuminating portion 404 formed at the upper surface 403b to illuminate the short pointer 4.

FIG. 14A is a perspective view of the long pointer 5 of the embodiment. FIG. 14B is a cross-sectional view of the long pointer 5 of the embodiment. The long pointer 5 has a structure similar to the short pointer 4.

The long pointer 5 includes a pointer portion 502, a shaft 501 and an illuminating portion 503 formed at the pointer portion 502. The long pointer 5 is further provided with a concave portion 504 formed at the lower part of the shaft 501.

The long pointer 5 is composed of a translucent material such as a transparent resin or the like, for example. Further, a metal layer is formed at the surface of the long pointer 5, other than the illuminating portion 503, by metal deposition or the like so that the light guided to the long pointer 5 is selectively illuminated from the illuminating portion 503. The illuminating portion 503 is formed by removing the metal layer at the corresponding area of the long pointer 5 by laser, after forming the metal layer on the entire surface of the long pointer 5.

The concave portion 504 is formed so that the first light guide member 6 that is exposed from the opening portion 401 of the short pointer 4 can be fitted and fixed in the concave portion 504. The concave portion 504 is fitted to the first end of the first light guide member 6 so that the first end of the first light guide member 6 contacts the side wall 505 of the long pointer 5 at the pointer portion 502 side within the concave portion 504.

A lower surface 502a and an upper surface 502b of the long pointer 5 are not in parallel relationship with each other. In this embodiment, the lower surface 502a is inclined with respect to the horizontal direction which is perpendicular to the rotation axis direction. With this structure, the light reflected by the reflecting surface 601 can be further reflected from the lower surface 502a toward the upper surface 502b. Further, the lower surface 502a may be formed with a fine pattern by texturing, graining, engraving or the like to diffuse the received light.

As described above, the surface of the long pointer 5, other than the illuminating portion 503, is covered by the metal layer. The light does not leak from the long pointer 5 where the metal layer is formed so that the light only originates from the illuminating portion 503.

The light from the LED 12 is guided by the first light guide member 6 to the long pointer 5 and then the light reflected by the lower surface 502a is guided to the illuminating portion 503 formed at the upper surface 502b to illuminate the long pointer 5.

(Light Paths)

Figure 15:
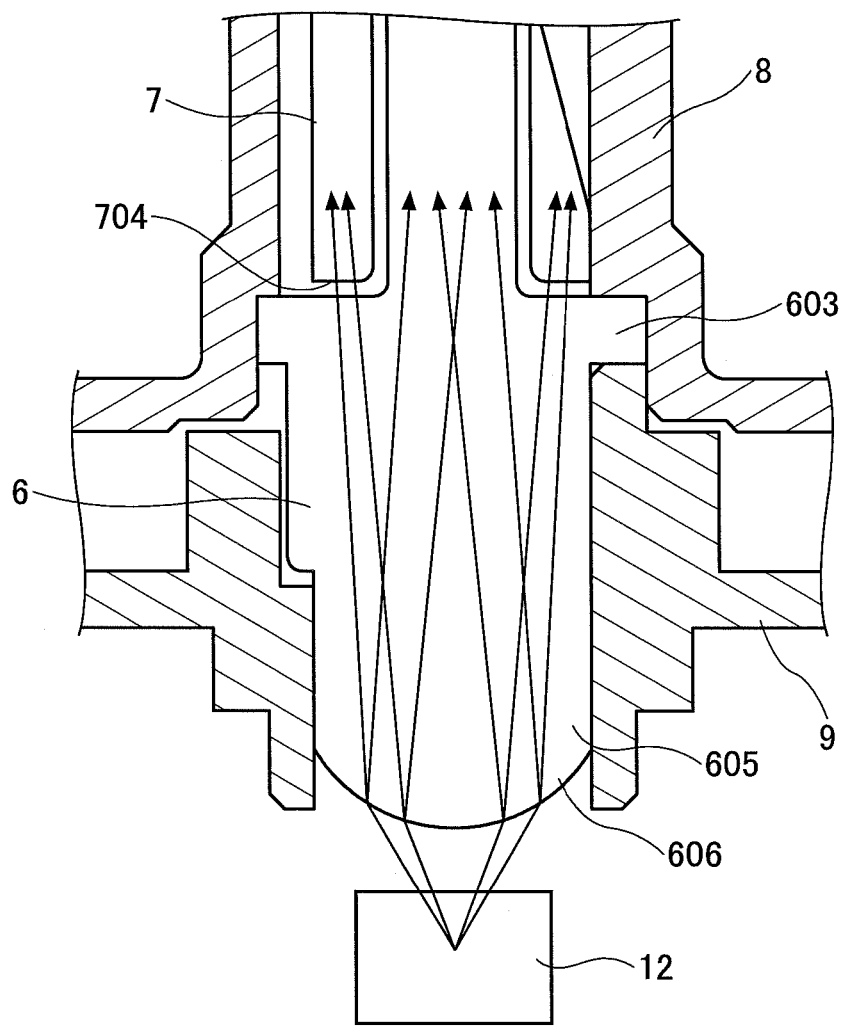
FIG. 15 is a view for explaining light paths of the first light guide member and the second light guide member of an embodiment.

FIG. 15 is a view for explaining light paths of the first light guide member 6 and the second light guide member 7 of the embodiment. Arrows shown in FIG. 15 are the light paths of the light emitted by the LED 12.

The light emitted by the LED 12, which is radially diffused, is received by the light receiving surface 606 having a spherical shape of the light receiving portion 605 of the first light guide member 6.

By forming the light receiving surface 606 to have a spherical shape and a fine pattern by texturing, graining, engraving or the like, it is possible to guide the light in the rotation axis direction while diffusing the light at the light receiving surface 606 to equalize the amount of the light in the light receiving portion 605.

Further, for the LED 12, as an LED element is covered by a resin, the color of the light may be different at its center portion and peripheral portion. Even in such a case, by diffusing the light by the light receiving surface 606 to mix the light, the color of the light in the light receiving portion 605 can be made uniform.

In this embodiment, the diameter of the light receiving portion 605 of the first light guide member 6 in the direction perpendicular to the rotation axis direction (hereinafter simply referred to as a lateral direction) may be larger than those of the inserting portion 602 of the first light guide member 6 and the penetrating hole 703 of the second light guide member 7. The light received by the light receiving portion 605 is guided in the rotation axis direction and split to the inserting portion 602 of the first light guide member 6 and the light receiving surface 704 of the second light guide member 7.

In this embodiment, the first light guide member 6 is formed so that the outer diameter of the inserting portion 602 in the lateral direction is 1.8 mm and the second light guide member 7 is formed so that the outer diameter of the light receiving surface 704 in the lateral direction is 4 mm. In other words, the outer diameters in the lateral direction between the first light guide member 6 and the second light guide member 7 are set to a ratio of about 1:2. With this structure, the amount of the light illuminated from the short pointer 4 and the long pointer 5 can be almost the same. By changing the ratio of the outer diameters of these, the valance of the amount of the light to be supplied to the short pointer 4 and the long pointer 5 can be adjusted.

Here, as the second light guide member 7 is fixed to and supported by the shading member 8, the second light guide member 7 does not contact the first light guide member 6 but the shading member 8 contacts the flange portion 603 of the first light guide member 6 to slide on the first light guide member 6. With reference to FIG. 3, there is a space between the light receiving surface 704 of the second light guide member 7 and the light receiving portion 605 of the first light guide member 6. With this structure, the first light guide member 6 and the second light guide member 7, which are separately rotated, do not contact with each other so that the fines (small particles) generated by rotating the light guide members or abrasion between the light guide members can be prevented.

If the fines or abrasion are generated, the illumination valance between the short pointer 4 and the long pointer 5 becomes degraded and the light amounts of them are reduced. However, according to the structure of the embodiment, as the first light guide member 6 and the second light guide member 7 do not contact, generation of the fines or abrasion is prevented. Therefore, the illumination valance between the short pointer 4 and the long pointer 5 and the light amounts associated with them are maintained for a long time.

Figure 16:
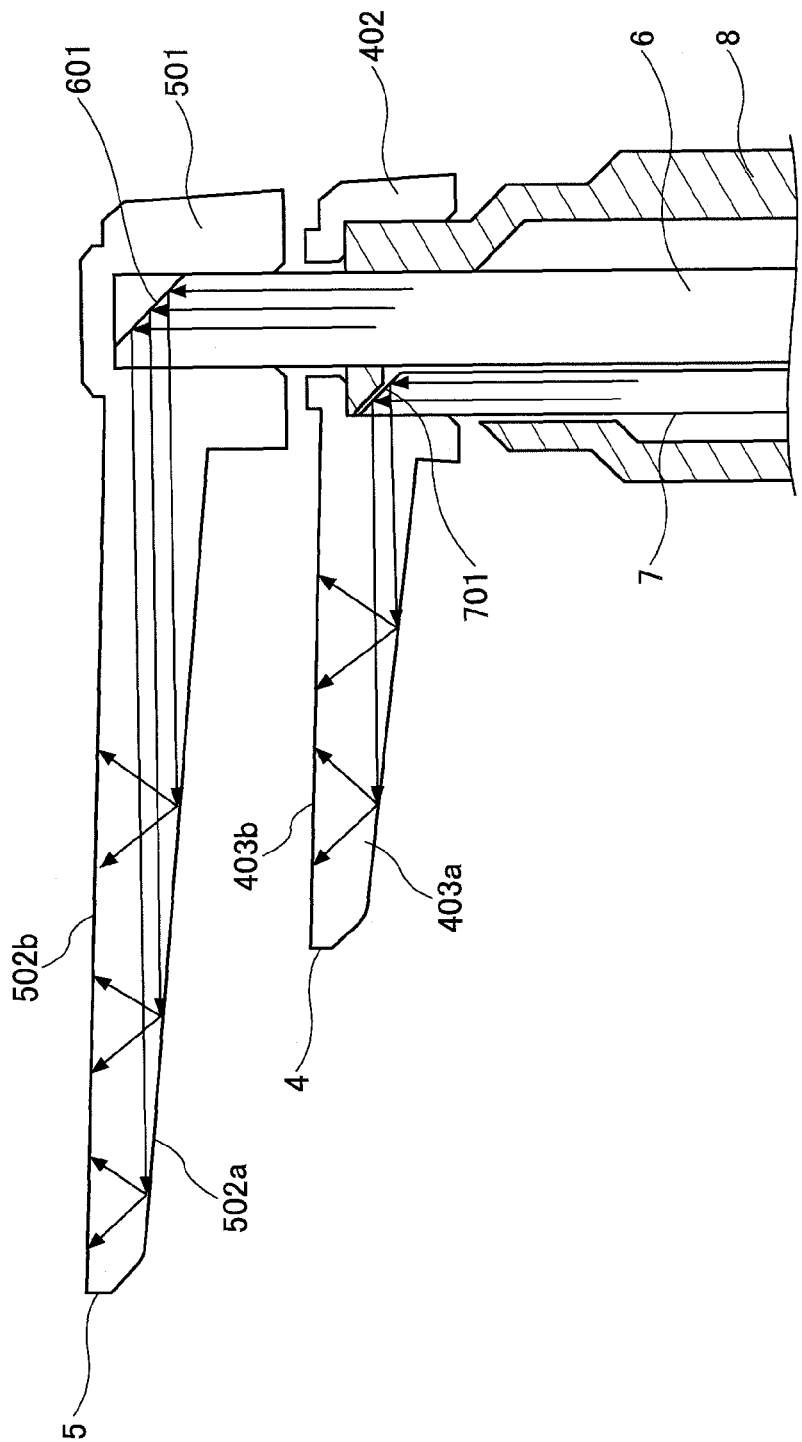
FIG. 16 is a view for explaining light paths from the first light guide member to the long pointer and the second light guide member to the short pointer of an embodiment.

FIG. 16 is a view for explaining light paths from the first light guide member 6 to the long pointer 5 and the second light guide member 7 to the short pointer 4 of the embodiment. Arrows shown in FIG. 16 are the light paths of the light emitted by the LED 12.

The light guided to the first light guide member 6 is reflected by the reflecting surface 601 toward the long pointer 5 and further diffused and reflected at the lower surface 502a of the long pointer 5 to illuminate the illuminating portion 503 formed at the upper surface 502b of the long pointer 5.

Further, the light guided to the second light guide member 7 is reflected by the reflecting surface 701 toward the short pointer 4 and further diffused and reflected at the lower surface 403a of the short pointer 4 to illuminate the illuminating portion 404 formed at the upper surface 403b of the short pointer 4.

In this embodiment, by forming the fine patterns on the lower surface 403a of the short pointer 4 and the lower surface 502a of the long pointer 5 by texturing, graining, engraving or the like, the lights are diffused and reflected at the lower surface 403a and the lower surface 502a to reduce the variation of the amount of the light at the illuminating portion 404 and the illuminating portion 503, respectively.

Further, by providing the reflecting surfaces 601 and 701 at the first ends of the first light guide member 6 and the second light guide member 7, respectively, by themselves, the diameters of the shafts of the long pointer 5 and the short pointer 4 can be smaller and the thicknesses of the shafts of the short pointer 4 and the long pointer 5 can be thinner.

Therefore, according to the embodiment, the diameters of the shafts of the long pointer 5 and the short pointer 4 can be smaller and the thicknesses of the shafts of the short pointer 4 and the long pointer 5 can be thinner to improve the appearance of the display device 100, and the distance between the short pointer 4 and the long pointer 5 and the dial or the like can be shortened to reduce a parallax.

Further, the display device of the embodiment including two illuminated pointers which are coaxially rotated, may be applied to a pointer device for displaying speed and engine speed of an automobile with two pointers, an analog clock including an hour pointer (hour hand) and a minute pointer (minute hand) or the like.

According to the embodiment, a display device including two pointers, which are coaxially rotated around the same rotation axis but are separately rotated, and are capable of illuminating pointers with enough amount of the light so that they can be read in the dark while having the diameters of the pointers around a rotation axis smaller and the thickness of the pointers in the rotation axis thinner to improve an appearance of the display device 100 and reduce a parallax, can be provided.

The present invention is not limited to the specifically disclosed embodiments, and variations and modifications may be made without departing from the scope of the present invention.

The present application is based on Japanese Priority Application No. 2011-228986 filed on Oct. 18, 2011, the entire contents of which are hereby incorporated herein by reference.

What is claimed is:

1. A display device comprising:
   a light source;
   a first light guide member having a circular cylinder shape and provided with a first reflecting surface formed at a first end of the first light guide member to reflect light emitted by the light source and received at a second end of the first light guide member opposite to the first end;
   a second light guide member provided with a penetrating hole in which the first light guide member is inserted to surround at least a part of the first light guide member and a second reflecting surface formed at a first end of the second light guide member to reflect the light emitted by the light source and received at a second end of the second light guide member opposite to the first end, the light source being provided at the second end sides of the first light guide member and the second light guide member;
   a first pointer fixed to and supported by the first end of the first light guide member to be illuminated by the light guided from the first light guide member by being reflected by the first reflection surface;
   a second pointer fixed to and supported by the first end of the second light guide member to be illuminated by the light guided from the second light guide member by being reflected by the second reflection surface; and
   a driving member configured to separately rotate the first light guide member and the second light guide member around a same rotation axis with the first pointer and the second pointer, respectively.

2. The display device according to claim 1,
   wherein the first light guide member is further provided with a light receiving portion formed at the second end of the first light guide member and an inserting portion that is inserted into the penetrating hole of the second light guide member, and
   the light receiving portion has a diameter in a direction perpendicular to the rotation axis larger than a diameter of the inserting portion and a diameter of the penetrating hole of the second light guide member in the direction perpendicular to the rotation axis so that the light received by the light receiving portion of the first light guide member is split between the inserting portion of the first light guide member and the second end of the second light guide member.

3. The display device according to claim 1,
   wherein a light receiving portion of the first light guide member has a spherical shape at the second end facing the light source.

4. The display device according to claim 1,
   wherein the second light guide member is formed to have a light receiving surface extending in a direction perpendicular to the rotation axis direction, and has a circular cone shape, in which the reflecting surface is a summit and the light receiving surface is a bottom surface,
   the penetrating hole is formed to extend from the light receiving surface in the rotation axis direction along the rotation axis, and
   the second reflection surface is formed at a position shifted from the rotation axis.

5. The display device according to claim 4,
   wherein the second reflecting surface is formed at a side closer to the extending direction of the second pointer.

6. The display device according to claim 5,
wherein the second light guide member has a flat surface extending in the rotation axis direction at the side closer to the extending direction of the second pointer and an inclined or curved surface at an opposing side of the flat surface that reduces the cross section of the second light guide member from the second end towards the first end.

7. The display device according to claim 4,
wherein the first reflection surface of the first light guide member is formed on the rotation axis.

8. The display device according to claim 1, further comprising:
a shading member that covers the first light guide member and the second light guide member so that the lights passing through the first light guide member and the second light guide member do not leak, and
the shading member fixes and supports the second light guide member inside such that the second light guide member does not contact the first light guide member when being rotated by the driving member.

9. The display device according to claim 8,
wherein the shading member includes a gear to receive a driving force by the driving member to be rotated with the second light guide member.

10. The display device according to claim 8,
wherein the shading member has an inclined surface to guide the second light guide member so that the rotational position of the second light guide member is aligned.

* * * * *